US006857896B2

(12) United States Patent
Rupert et al.

(10) Patent No.: US 6,857,896 B2
(45) Date of Patent: Feb. 22, 2005

(54) SMART CONNECT ELECTRICAL RECEPTACLE ASSEMBLY

(75) Inventors: Brian K. Rupert, Kendallville, IN (US); Gavin L. Replogle, Kendallville, IN (US)

(73) Assignee: Pent Technologies, Inc., Kendallville, IN (US)

( * ) Notice: Subject to any disclaimer, the term of this patent is extended or adjusted under 35 U.S.C. 154(b) by 0 days.

(21) Appl. No.: 10/409,896

(22) Filed: Apr. 9, 2003

(65) Prior Publication Data

US 2003/0194904 A1 Oct. 16, 2003

Related U.S. Application Data

(60) Provisional application No. 60/371,311, filed on Apr. 10, 2002.

(51) Int. Cl.[7] .................................................. H02J 1/00

(52) U.S. Cl. .......................... 439/489; 439/955; 307/38

(58) Field of Search ................................ 439/488, 489, 439/955; 340/656; 307/38

(56) References Cited

U.S. PATENT DOCUMENTS

| | | | | |
|---|---|---|---|---|
| 3,742,148 A | * | 6/1973 | Ledeen et al. | 370/439 |
| 4,418,971 A | * | 12/1983 | Liss | 439/61 |
| 5,044,971 A | | 9/1991 | Hollingsworth | 439/21.5 |
| 5,172,008 A | * | 12/1992 | Odagiri | 307/41 |
| 5,207,594 A | * | 5/1993 | Olson | 439/490 |
| 5,208,485 A | | 5/1993 | Krinsky et al. | 307/41 |
| 5,268,592 A | | 12/1993 | Bellamy et al. | 307/43 |
| 5,658,158 A | | 8/1997 | Milan | 439/214 |
| 5,745,670 A | * | 4/1998 | Linde | 714/22 |
| 5,855,494 A | | 1/1999 | Blaszczyk et al. | 439/502 |
| 5,885,109 A | | 3/1999 | Lee et al. | 439/652 |
| 6,179,665 B1 | | 1/2001 | Rossman et al. | 439/654 |

* cited by examiner

*Primary Examiner*—Neil Abrams
(74) *Attorney, Agent, or Firm*—Taylor & Aust, P.C.

(57) ABSTRACT

An electrical assembly includes a plurality of electrical modules. Each of the plurality of electrical modules, such as power receptacles of a wall panel system, are sequentially electrically connected to at least one other of the plurality of electrical modules. Each of the plurality of electrical modules include a prior module detection circuit that determines a number of modules being connected and is formed to limit the activation of more than a certain number of such modules.

23 Claims, 4 Drawing Sheets

SMART CONNECT ELECTRICAL RECEPTACLE ASSEMBLY

CROSS REFERENCE TO RELATED APPLICATIONS

This is a non-provisional application based upon U.S. provisional patent application Ser. No. 60/371,311, entitled “SMART CONNECT”, filed Apr. 10, 2002.

BACKGROUND OF THE INVENTION

1. Field of the Invention

The present invention relates to an electrical distribution system, and, more particularly, to an electrical distribution system, which limits the activation of more than a predetermined number of electrical receptacles.

2. Description of the Related Art

Electrical codes limit the number of receptacles which can be sequentially connected. It is common for an electrical power source to be routed to an electrical receptacle and power then routed from that electrical receptacle to a subsequent electrical receptacle and this is continued for several electrical receptacles. While there is no physical limitation in wiring in this manner, there are electrical considerations such as contact resistance that may preclude the subsequent connection of electrical receptacles ad infinitum. An electrician can circumvent the electrical code by wiring too many receptacles in a sequential manner.

A method to prevent the connection of too many electrical receptacles is to key cables and connectors on electrical receptacles to thereby preclude the attachment of too many electrical receptacles in a single circuit. A disadvantage of this method is that numerous unique cables and receptacle connections must be made. This reduces flexibility and increases inventory.

What is needed in the art is a system that will limit the number of electrical receptacles in a single power circuit without relying on unique keyed connector cable systems.

SUMMARY OF THE INVENTION

The present invention provides a smart connect receptacle for use in a modular wall panel system.

The invention comprises, in one form thereof, an electrical assembly includes a plurality of electrical modules. Each of the plurality of electrical modules are sequentially electrically connected to at least one other of the plurality of electrical modules. Each of the plurality of electrical modules include a prior module detection circuit.

The present invention advantageously allows an installer to connect electrical receptacles in a sequential manner.

Another advantage is that only one type of interconnecting cable is necessary.

A further advantage of the present invention is that each of the receptacles can be identical.

A still further advantage of the present invention is that any receptacles beyond a predetermined number will not be electrically activated.

Yet another advantage of the present invention is that compliance with the electrical code is automatic and not circumventable by an installer.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
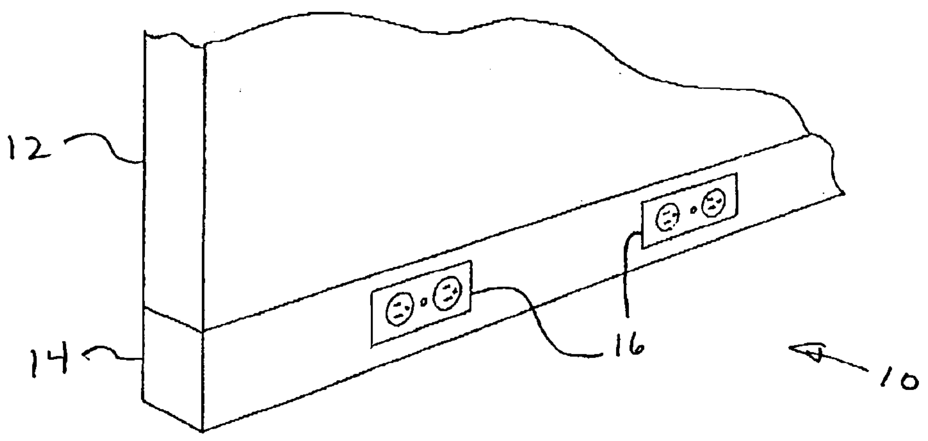
FIG. 1 is a perspective view of an embodiment of a modular wall panel system including a power distribution assembly having smart connect receptacles of the present invention.

Referring now to the drawings, and more particularly to FIG. 1, there is shown a modular wall panel system 10 including a modular wall panel 12, a raceway 14 and smart connector receptacle assemblies 16. Modular wall panel system 10 is utilized in a modern office space as partitioning walls in an open floor plan environment.

Figure 3:
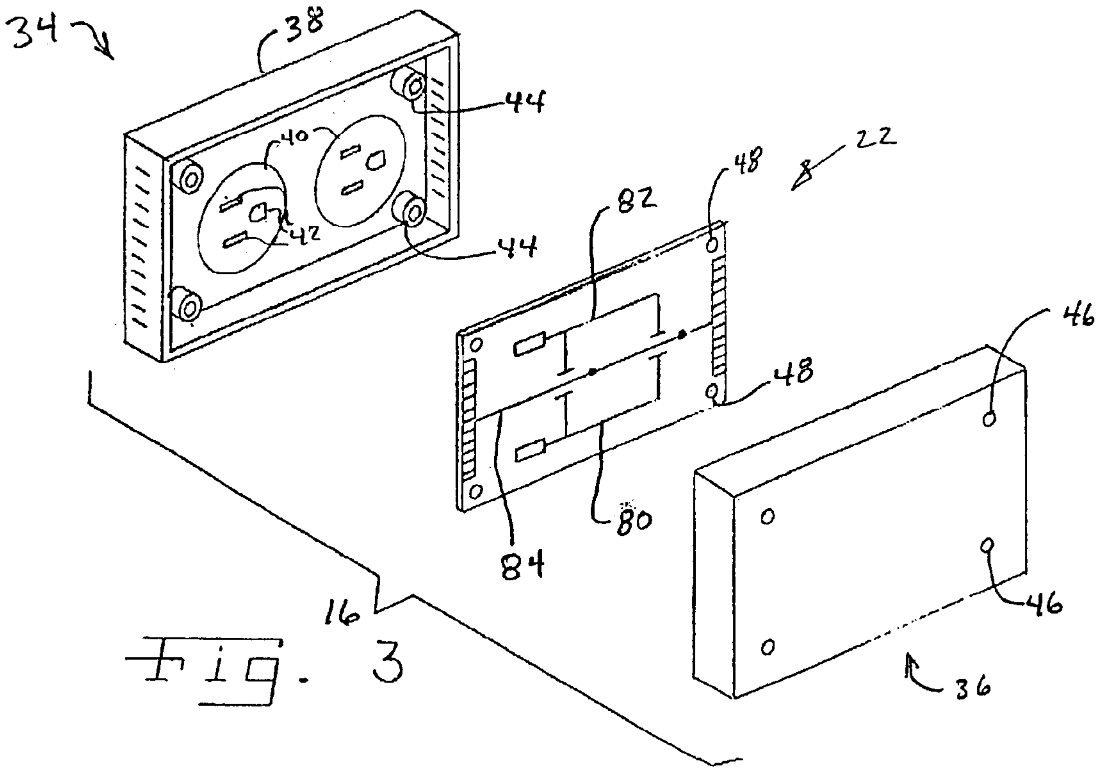
FIG. 3 is an exploded perspective view of an embodiment of the smart connect receptacles of FIGS. 1 and 2.
Figure 2:
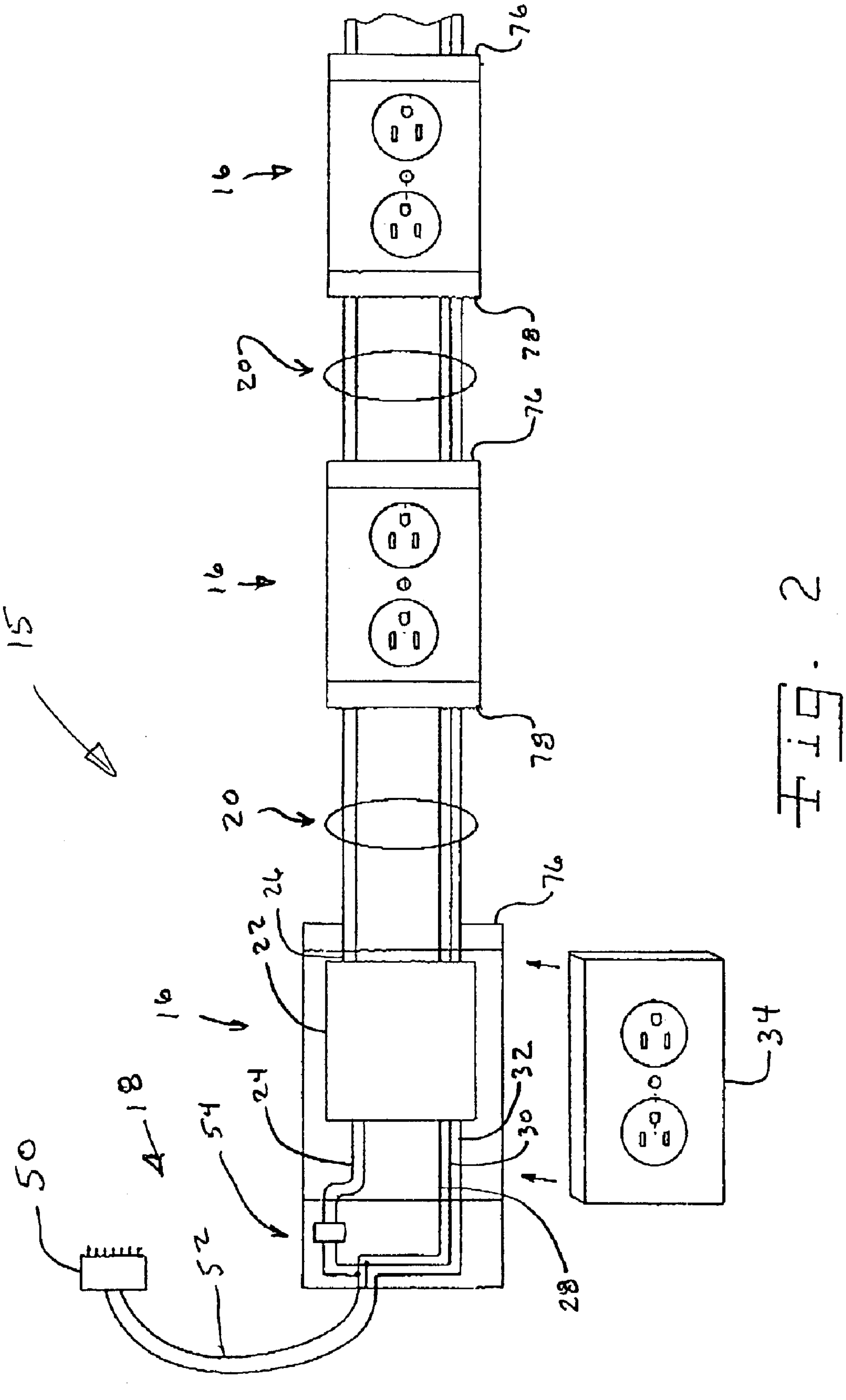
FIG. 2 is a block diagram of the power distribution assembly of the modular wall panel system of FIG. 1.
Figure 4:
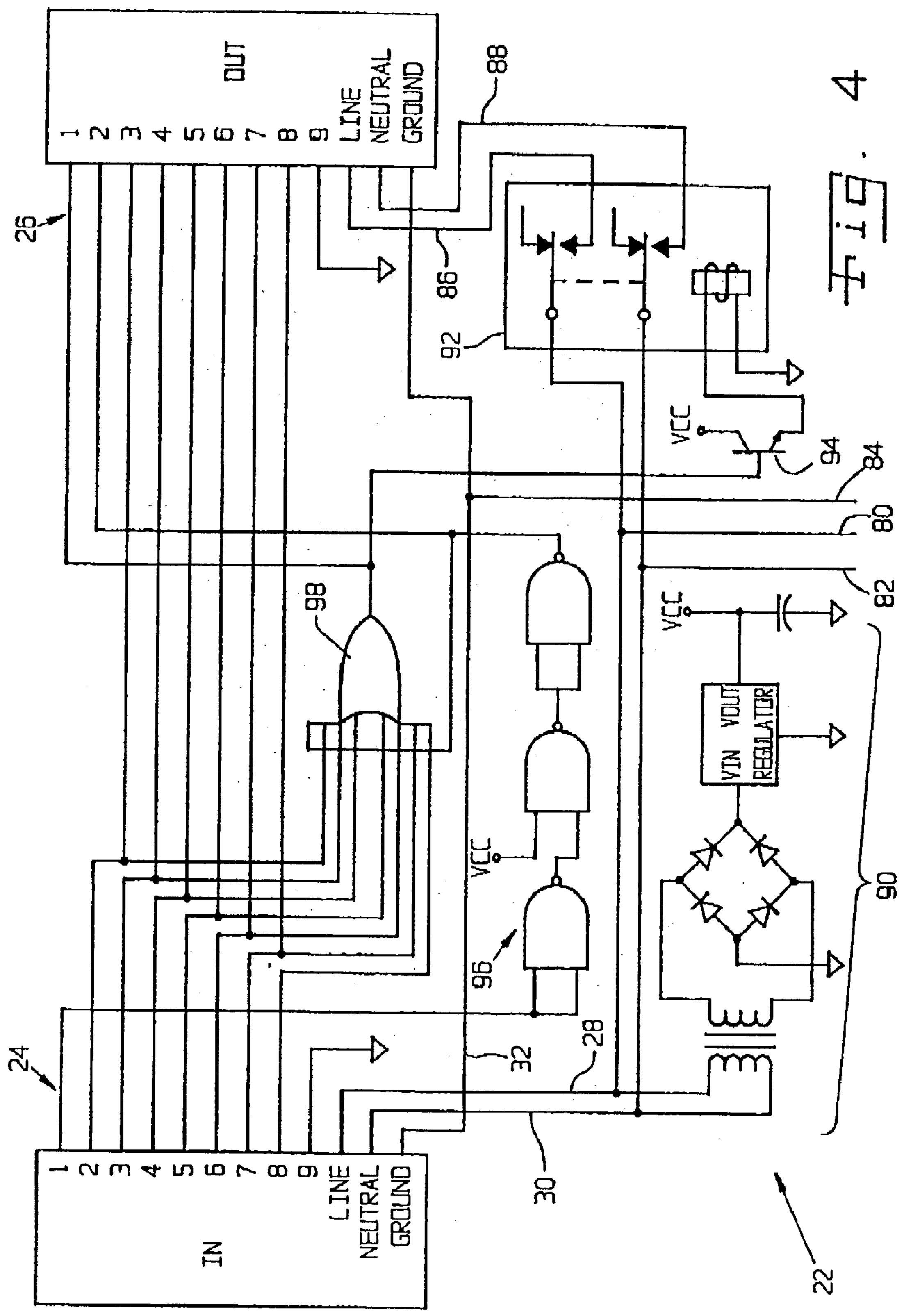
FIG. 4 is a schematic diagram of a circuit in the smart connect receptacles of FIGS. 1–3.

Now, additionally referring to FIGS. 2–4, raceway 14 at least partially encloses power distribution system 15, which includes smart connect receptacle assemblies 16, an initial power cable 18 and intermediate cables 20. Initial power cable 18 is connected to a power source and provides power to smart connect receptacle assemblies 16. Intermediate cables 20 are connected from one receptacle assembly 16 to another receptacle assembly 16 in a sequential manner.

Receptacle assemblies 16 are electrical modules and include a smart circuit assembly 22, incoming signal conductors 24, outgoing signal conductors 26, a line conductor 28, a neutral conductor 30, a ground conductor 32, a receptacle socket assembly 34 and a receptacle back cover 36. Receptacle socket assembly 34 includes a cover 38, electrical sockets 40 having socket lugs 42 and mounting bosses 44. Holes 46 in smart circuit assembly 22 as well as holes 48 in receptacle back cover 36 allow for the mounting of smart circuit assembly 22 in smart connect receptacle assembly 16.

Figure 5:
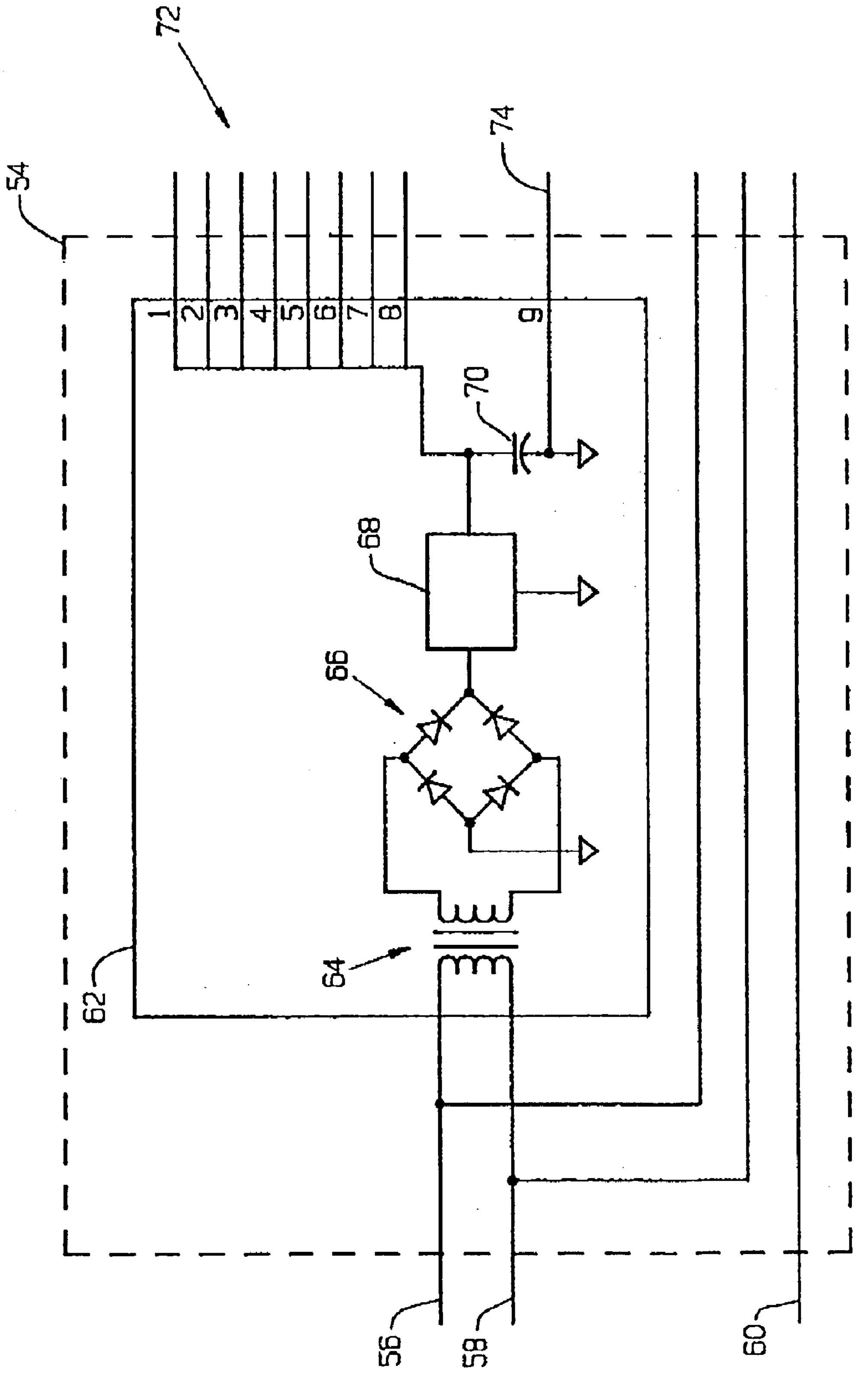
FIG. 5 is a schematic diagram of an embodiment of a first connector of the power distribution assembly of FIG. 2.

Now additionally referring to FIG. 5, initial power cable 18 includes a power interface connector 50, conductors 52 and an initial smart connector assembly 54. Power interface connector 50 interfaces with an electrical power source having at least a power connection, a neutral connection and a ground connection. Power interface connector 50 may additionally connect to multiple power, neutral and ground conductors. Conductors 52 transfer electrical power from power interface connector 50 to initial smart connector assembly 54.

Initial smart connector assembly 54 includes a line conductor 56, a neutral conductor 58, a ground conductor 60 and a connector circuit assembly 62. Connector circuit assembly 62 includes a transformer 64, a rectification circuit 66, a voltage regulator 68, a capacitor 70, signal lines 72 and a reference ground 74. Connector circuit assembly 62 provides initial signal lines 72 to be utilized by smart circuit assemblies 22 to thereby preclude the attachment of more than a predetermined number of electrical receptacles. In this example, there is a limitation of eight sequentially connected smart connect receptacle assemblies 16. The first eight receptacle assemblies 16 are electrically functional, because the eight separate signal lines of signal lines 72 provide information, which is interpreted by each electrical module 16 to thereby only activate the next electrical module 16 if there are fewer than seven prior electrical modules 16. Connector circuit assembly 62 provides a digital logic value or signal level by way of signal lines 72 to subsequent smart connect receptacle assemblies 16. Also, reference ground line 74 is a reference to which subsequent digital circuits determine the status of signal lines 72. Signal lines 72 and reference ground 74 are small gauge wires for the transfer of electrical signals. In contrast, line conductor 56, neutral conductor 58 and ground conductor 60 are of appropriate size to carry power, such as for a 15 amp. circuit.

Intermediate cables 20 include first connector 76 and second connector 78. Connector 76 receives power and signal lines from a preceding smart connect receptacle assembly 16, while connector 78 passes it on to a succeeding receptacle assembly 16. Receptacles 76 and 78 may be identical, however, connectors 76 and 78 may be keyed to only allow power to be supplied to connector 76.

Smart circuit assembly 22 includes line conductor 80, neutral conductor 82, a ground conductor 84, a modified line conductor 86, a modified neutral conductor 88, a DC power supply 90, a relay 92, a transistor 94, an inverting circuit 96 and an OR gate 98. Conductors 80, 82 and 84, respectively, supply power, return and ground connections for sockets 40. Modified line conductor 86 and modified neutral conductor 88 provide power to a subsequent smart connect receptacle assembly 16 if relay 92 is energized, which depends upon the number of preceding smart connect receptacle assemblies 16. If, as in this example, a subsequent smart connect receptacle assembly 16 is the ninth in the power circuit, then line conductor 86 and neutral conductor 88 are not energized in the previous (the eighth) receptacle assembly 16. In this way circuit assembly 22 is a prior module detection circuit 22, detecting the number of receptacle assemblies 16 that are connected precedent to itself.

DC power supply 90 provides DC power to smart circuit assembly 22. Alternatively, DC power supply 90 could be replaced by a power source in initial smart connector assembly 54 with a power and return line provided therefrom to each smart connect receptacle assembly 16.

Incoming signal lines 24 provide digital information to OR gate 98. It should be noted that line 1 of incoming signal conductors 24 is directed to inverter circuit 96, where the logical value coming in on line 1 is inverted to be the logical negative thereof. The output of inverter circuit 96 is directed to line 2 of outgoing signal conductors 26 and to an input of OR gate 98. It should also be noted that incoming lines 2–7 are respectively directed to lines 3–8 of outgoing signal conductors 26. If the output of OR gate 98 is a logic one or positive voltage, the base of transistor 94 is driven to cause NPN transistor 94 to conduct causing a current to flow from the collector through the emitter of transistor 94, thereby driving an energizing coil in relay 92. OR gate 98, transistor 94 and relay 92 function as a subsequent module activation circuit causing power to be conveyed out of smart circuit assembly 22 by way of modified line conductor 86 and modified neutral conductor 88. Conversely smart circuit assembly 22 does not activate any subsequent modules 16, when the predetermined number, in this example seven previous electrical modules 16, are detected. Relay 92 has two normally open contacts, one for line conductor 28 and one for neutral conductor 30, which are then, respectively, connected to modified line conductor 86 and modified neutral conductor 88 when relay 92 is energized.

Outgoing signal conductors 26 of each subsequent smart connect receptacle assembly 16 are one-by-one modified to be logical zero, such that when lines 2-8 of incoming signal conductors 24, are logical zero and line 1 is logical one, which occurs in the eighth smart connect receptacle assembly 16, then the inputs to OR gate 98 are all zero, causing the output of OR gate 98 to be a logic zero. When the output of OR gate 98 is a logic zero, there is no current to drive the base of transistor 94, which in turn leaves the coil of relay 92 unenergized, thereby leaving line conductor 86 and neutral conductor 88 unenergized for any subsequent smart connect receptacle subassembly 16, or for that matter, for any other modules that may be attached thereto.

Alternatively, the signals conveyed by incoming signal conductors 24 and outgoing signal conductors 26 may be replaced by a binary coded decimal system or other coded method to reduce the number of signal conductors needed to convey the information to subsequent smart connect receptacle assemblies 16. In addition, other manners of providing information to subsequent assembly 16 may be in the form of fiber optics or a single communication line.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical assembly, comprising:

a plurality of electrical modules, each of said plurality of electrical modules being sequentially electrically connected to at least one other of said plurality of electrical modules, each of said plurality of electrical modules including a prior module detection circuit that detects how many of said plurality of electrical modules precede each of said plurality of electrical modules.

2. The assembly of claim 1, wherein said prior module detection circuit further comprises:

at least one input signal line conveying information; and a logic circuit utilizing said information to one of activate and not activate a subsequent one of said plurality of electrical modules.

3. The assembly of claim 2, wherein said prior module detection circuit further comprises at least one output signal line, said logic circuit at least partially modifying said information, thereby defining modified information, said modified information being conveyed to said at least one output signal line.

4. An electrical assembly, comprising:

a plurality of electrical modules, each of said plurality of electrical modules being sequentially electrically connected to at least one other of said plurality of electrical modules, each of said plurality of electrical modules including a prior module detection circuit;

wherein said prior module detection circuit includes:

at least one input signal line conveying information; and a logic circuit utilizing said information to one of activate and not activate a subsequent one of said plurality of electrical modules, wherein said logic circuit does not activate said subsequent one of said plurality of electrical modules if said information indicates that there are more than a predetermined number of said plurality of electrical modules preceding said logic circuit.

5. The assembly of claim 4, wherein said predetermined number is 7.

6. The assembly of claim 1, further comprising an initial power connection, said plurality of electrical modules including a first electrical module connected to said initial power connection, said initial power connection including at least one signal line to communicate at least one logic signal to said first electrical module.

7. The assembly of claim 1, further comprising a plurality of substantially identical intermediate electrical cables sequentially electrically connecting said plurality of electrical modules.

8. The assembly of claim 7, wherein said plurality of electrical modules include electrical power receptacles.

9. A modular wall panel system, comprising:

at least one module wall panel;

at least one power delivery system being connected to at least one of said modular wall panels, said at least one power delivery system including:

a plurality of electrical modules, each of said plurality of electrical modules being sequentially electrically connected to at least one other of said plurality of electrical modules, each of said plurality of electrical modules including a prior module detection circuit that detects how many of said plurality of electrical modules precede each of said plurality of electrical modules.

10. The system of claim 9, wherein said prior module detection circuit further comprises:

at least one input signal line conveying information; and a logic circuit utilizing said information to one of activate and not activate a subsequent one of said plurality of electrical modules.

11. The system of claim 10, wherein said prior module detection circuit further comprises at least one output signal line, said logic circuit at least partially modifying said information, thereby defining modified information, said modified information being conveyed to said at least one output signal line.

12. A modular wall panel system, comprising:

at least one module wall panel;

at least one power delivery system being connected to at least one of said modular wall panels, said at least one power delivery system including:

a plurality of electrical modules, each of said plurality of electrical modules being sequentially electrically connected to at least one other of said plurality of electrical modules, each of said plurality of electrical modules including a prior module detection circuit, said prior module detection circuit further including:

at least one input signal line conveying information; and a logic circuit utilizing said information to one of activate and not activate a subsequent one of said plurality of electrical modules, wherein said logic circuit does not activate said subsequent one of said plurality of electrical modules if said information indicates that there are more than a predetermined number of said plurality of electrical modules preceding said logic circuit.

13. The system of claim 12, wherein said predetermined number is 7.

14. The system of claim 9, further comprising an initial power connection, said plurality of electrical modules including a first electrical module connected to said initial power connection, said initial power connection including at least one signal line to communicate at least one logic signal to said first electrical module.

15. A method of preventing activation of subsequent electrical modules, comprising the steps of:

electrically sequentially connecting a plurality of electrical modules including a present electrical module;

determining within said present electrical module whether to electrically activate one of said plurality of electrical modules that is subsequent to said present electrical module; and determining a number of prior electrical modules.

16. The method of claim 15, further comprising the step of receiving information from at least one of said plurality of electrical modules precedent to said present electrical module.

17. A method of preventing activation of subsequent electrical modules, comprising the steps of:

electrically sequentially connecting a plurality of electrical modules including a present electrical module;

determining within said present electrical module whether to electrically activate one of said plurality of electrical modules that is subsequent to said present electrical module; and receiving information from at least one of said plurality of electrical modules precedent to said present electrical module, wherein said determining step includes the substep of logically determining from said information a number of said electrical modules that precede said present electrical module.

18. The method of claim 17, further comprising the step of electrically activating one of said plurality of electrical modules that is subsequent to said present electrical module if said number is less than a predetermined number.

19. The method of claim 18, wherein said predetermined number is 7.

20. The method of claim 15, wherein said determining step comprises the substep of logically ORing incoming signal lines, thereby producing a signal.

21. The method of claim 20, further comprising the step of outputting said signal on an output signal line.

22. The method of claim 20, further comprising the step of supplying electrical power to an output power conductor if said signal is a logic 1.

23. The method of claim 15, further comprising the steps of:

removably connecting an initial power connection to one of said plurality of electrical modules, said initial power connection including at least one signal conductor; and communicating at least one signal to at least one of said plurality of electrical modules.

* * * * *